(12) United States Patent
Moji

(10) Patent No.: US 7,578,366 B2
(45) Date of Patent: Aug. 25, 2009

(54) SNOWMOBILE AND STOPPER MECHANISM FOR SNOWMOBILE

(75) Inventor: Shinnosuke Moji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 395 days.

(21) Appl. No.: 11/346,509

(22) Filed: Feb. 2, 2006

(65) Prior Publication Data
US 2007/0193801 A1     Aug. 23, 2007

(51) Int. Cl.
*B62M 27/02* (2006.01)
(52) U.S. Cl. .................. 180/182; 180/186; 180/190
(58) Field of Classification Search ............. 180/182, 180/186, 190; 280/21.1, 22.1, 89, 89.1, 89.12, 280/771
See application file for complete search history.

(56) References Cited
U.S. PATENT DOCUMENTS

| 3,825,086 | A | 7/1974 | Bombardier |
| 4,826,184 | A | 5/1989 | Kuehmchel et al. |
| 5,992,552 | A | 11/1999 | Eto |
| 6,170,841 | B1 * | 1/2001 | Mizuta ..................... 280/89 |
| 6,234,262 | B1 | 5/2001 | Moore |
| 6,904,990 | B2 * | 6/2005 | Etou ........................ 180/190 |
| 7,089,917 | B1 * | 8/2006 | McKinster et al. ...... 123/509 |
| 7,096,988 | B2 * | 8/2006 | Moriyama ............... 180/190 |
| 7,249,647 | B2 * | 7/2007 | Nietlispach ............. 180/190 |
| 2005/0045397 | A1 * | 3/2005 | Vaisanen ................ 180/190 |

\* cited by examiner

*Primary Examiner*—Lesley D Morris
*Assistant Examiner*—Jacob Knutson
(74) *Attorney, Agent, or Firm*—Keating & Bennett, LLP

(57) ABSTRACT

A snowmobile includes a handlebar controlling the direction of a pair of skis, a link mechanism transferring a rotation movement of the handlebar, a conversion mechanism connected to the link mechanism and converting a movement of the link mechanism into a movement including a vector in a vehicle body width direction of the snowmobile, and a tie rod coupled to the conversion mechanism and transferring the movement of the conversion mechanism to the skis. A stopper mechanism is provided between the tie rods and the link mechanism to regulate an external force applied from the skis.

8 Claims, 10 Drawing Sheets

VEHICLE BODY
WIDTH DIRECTION

FRONT DIRECTION

FRONT DIRECTION

VEHICLE BODY WIDTH DIRECTION

SNOWMOBILE AND STOPPER MECHANISM FOR SNOWMOBILE

BACKGROUND OF THE INVENTION

1. Field of the Invention

The present invention relates to a snowmobile, in particular to a stopper mechanism for a snowmobile.

2. Description of the Related Art

A snowmobile is a vehicle for traveling on snow, in particular, the snowmobile runs on the surface of snow via a track belt, to which a driving force is transferred from an engine, and a pair of skis attached to the front of the vehicle body. The skis of the snowmobile can be rotated by a steering mechanism operated by a rider. The mechanism with which the steering rotates the skis is disclosed in e.g., U.S. Pat. Nos. 3,825,086; 4,826,184; 6,234,262; and 5,992,552.

The snowmobile often has a steering stopper attached to a link suspension so as to prevent the skis from rotating more than required. The steering stopper of the snowmobile usually uses two stoppers, a knuckle side stopper provided in a knuckle supporting the ski and a handlebar side stopper provided on the side of a handlebar.

The handlebar side stopper regulates excessive input from the handlebar caused by human operation and serves to prevent breakage of the steering system. On the other hand, the knuckle side stopper regulates a rotation direction during the handlebar operation and serves to prevent breakage of the steering system due to forces applied from the skis during full steering rotation of the vehicle. The steering stopper is designed such that the knuckle side stopper contacts a predetermined location around the knuckle before the handlebar side stopper operates and makes contact, in order to prevent breakage of the steering system due to forces applied from the skis.

However, the inventors discovered that there were some cases in which the knuckle side stopper was not exactly in contact with a predetermined location around the knuckle depending on a stroke (range of motion) of a front suspension. More specifically, in the case of a double wishbone type snowmobile including an upper arm and a lower arm, it often occurs that a rotation angle of the ski changes with the stroke of the front suspension and the knuckle side stopper is not in contact with the predetermined location around the knuckle, and thus the knuckle side stopper fails to function.

Even when the knuckle side stopper is not in contact with the predetermined location around the knuckle, the rotation of the ski can be controlled by the handlebar side stopper. However, in the situation where the knuckle side stopper is not in contact with the predetermined location around the knuckle, breakage of the steering system may not be prevented. In order to prevent breakage of the steering system, and also taking into consideration of the situation where the knuckle side stopper is not in contact with the predetermined location, it is necessary to increase the strength of a link system so as to withstand a reaction force applied from the skis during the vehicle rotation. However, increasing the strength of the link system might lead to an increase in the cost of the material and complexity of structure, and thereby lead to an increase in overall cost.

SUMMARY OF THE INVENTION

In order to overcome the problems described above, preferred embodiments of the present invention provide a stopper mechanism for a snowmobile which is more suitable for the snowmobile.

The snowmobile according to a preferred embodiment of the present invention is a snowmobile of the type running on a snow surface via a track belt, to which a driving force is transferred from an engine, and a pair of skis attached to a front portion of a vehicle body, the snowmobile including a handlebar controlling the direction of the skis, a link mechanism transferring a rotation movement of the handlebar, a conversion mechanism connected to the link mechanism and converting a movement of the link mechanism into a movement including a vector in a vehicle body width direction of the snowmobile, and a tie rod coupled to the conversion mechanism and transferring the movement of the conversion mechanism to the ski, wherein a stopper mechanism regulating an external force applied from the skis is provided between the tie rod and the link mechanism.

In a preferred embodiment of the present invention, the conversion mechanism serves as the stopper mechanism, the stopper mechanism including a main arm pivot connecting a rod, which transfers the movement of the link mechanism, and the tie rod, and a secondary arm pivot arranged in a rotation range of the main arm pivot and restricting a rotation movement of the main arm pivot.

Preferably, the main arm pivot and the secondary arm pivot are arranged adjacent to each other.

In another preferred embodiment, opposing surfaces of the main arm pivot and the secondary arm pivot are in contact with each other to restrict the rotation movement of the main arm pivot.

In another preferred embodiment, the stopper mechanism includes an arm pivot connecting a member which transfers the rotation movement of the link mechanism and the tie rod, and a stopper restricting a rotation of the arm pivot.

In another preferred embodiment, a handlebar stopper restricting a rotation movement of the handlebar is provided on the link mechanism or on the side of the handlebar rather than the link mechanism.

In another preferred embodiment, the skis are connected to a vehicle body frame of the snowmobile through a suspension.

In another preferred embodiment, the skis are coupled to the tie rod through a knuckle.

In another preferred embodiment, the snowmobile is a double wishbone type snowmobile including an upper arm and a lower arm.

The stopper mechanism for the snowmobile according to a preferred embodiment is a stopper mechanism controlling a rotation angle of a pair of skis and includes a rotatable rod associated with a rotation movement of a handlebar, a main arm pivot connected to the rod, a secondary arm pivot arranged adjacent to the main arm pivot and restricting a rotation of the main arm pivot, and a connection member connecting the main arm pivot and the secondary arm pivot to a tie rod.

In the present preferred embodiment, the stopper mechanism regulating an external force applied from the skis is provided between the conversion mechanism, which converts the movement of the link mechanism transferring the rotation movement of the handlebar, and the tie rod transferring the movement of the conversion mechanism to the ski. Therefore, the knuckle side stopper is always in contact with the predetermined location by the stroke of the suspension. As a result, a more suitable stopper mechanism for the snowmobile can be provided.

Other features, elements, steps, characteristics and advantages of the present invention will become more apparent

DETAILED DESCRIPTION OF PREFERRED EMBODIMENTS

Figure 1:
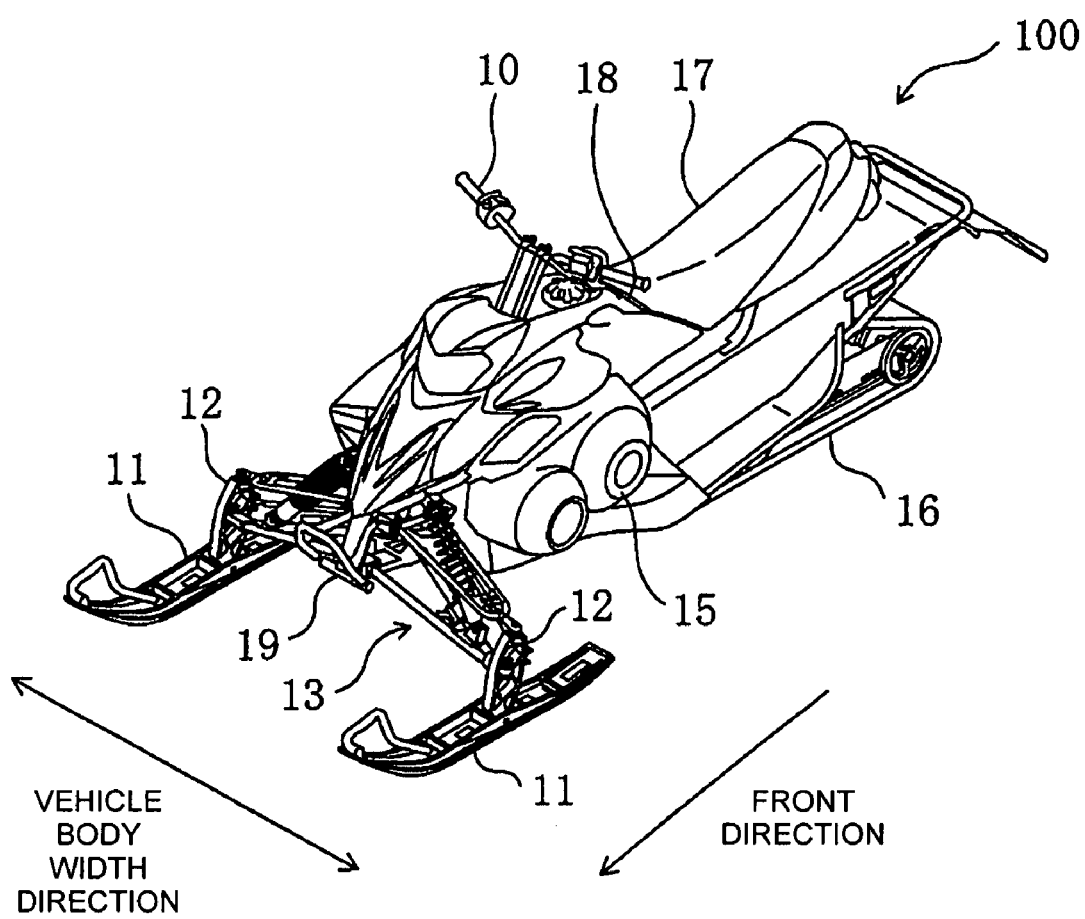
FIG. 1 is a perspective view showing an example of a snowmobile according to a preferred embodiment of the invention.

The inventors of the present invention discovered that a rotational stopper mechanism that minimizes external forces applied from the skis (reactive forces from the snow) can be more readily achieved by providing the stopper around each of the right and left knuckles. The inventors have also made intensive examination of a stopper mechanism that is capable of functioning regardless of the stroke (range of motion) of the front suspension, which is different from merely increasing the strength of the stopper mechanism.

Specifically, the inventors considered the mechanism in which excessive inputs were prevented from being applied to the steering system by keeping the relationship between the knuckle side stopper and the handlebar side stopper at the same state so that the knuckle side stopper can be operated first, regardless of the stroke (range of motion) of the front suspension. As a result, the inventors discovered that even without providing the stopper around each of the right and left knuckles, the phenomenon in which the knuckle side stopper fails to be in contact due to the stroke of the suspension can be prevented, as long as the stopper mechanism is provided between the conversion mechanism, which converts the movement of the link mechanism transferring the rotation movement of the handlebar, and the tie rod, which transfers the movement of the conversion mechanism to the skis.

Hereafter, with reference to the drawings, preferred embodiments of the invention will be described. In the drawings, the elements having substantially the same function are denoted by the same reference numerals to facilitate description. The invention is however not limited by the following preferred embodiments.

Figure 2:
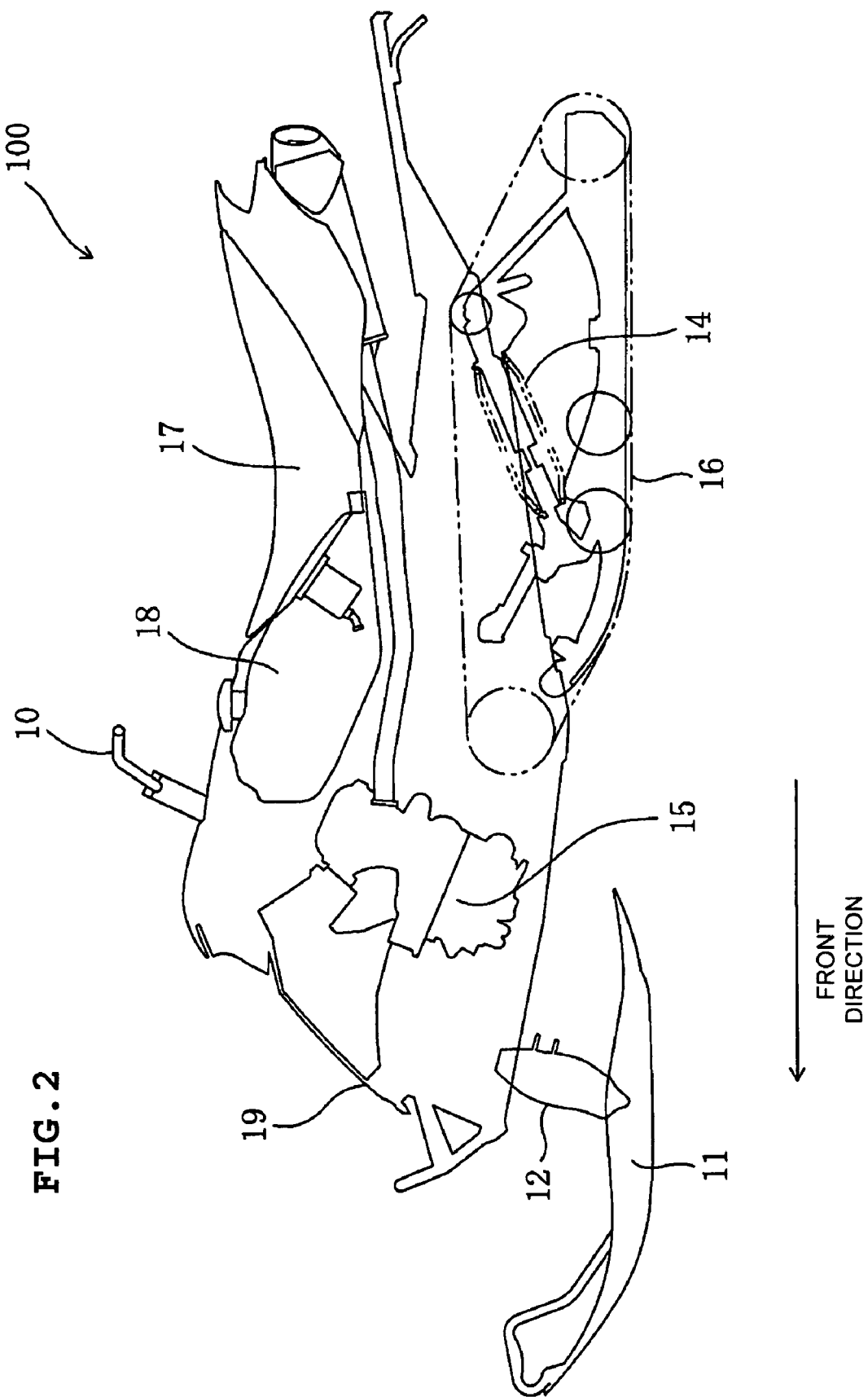
FIG. 2 is a perspective side view showing an example of the structure of the snowmobile according to the preferred embodiment of FIG. 1.

A snowmobile 100 according to a preferred embodiment of the present invention will be described with reference to FIGS. 1 and 2. FIG. 1 is a perspective view showing an example of the snowmobile 100 of the present preferred embodiment. FIG. 2 is a perspective side view showing an example of a structure of the snowmobile 100 of this preferred embodiment.

The snowmobile 100 of the present preferred embodiment includes a track belt 16 to which a driving force is transferred from an engine 15 and a pair of skis 11 attached to the front portion of a vehicle body, and runs on snow with the track belt 16 and the pair of skis 11. The direction of the skis 11 is controlled by a handlebar 10 operated by a rider.

A rotational movement of the handlebar 10 is transferred by a link mechanism, and a movement of the link mechanism is converted into a movement including a vector in the vehicle body width direction of the snowmobile 100 by a conversion mechanism, that is, in a direction to the left or the right. The link mechanism and the conversion mechanism will be described below.

Each ski 11 is coupled to a vehicle body frame (body) 19 via a knuckle 12 and a front suspension 13. The front suspension 13 of the present preferred embodiment is preferably a double wishbone type. The double wishbone suspension 13 can provide a stable shock absorbing capability and terrain following capability even in a high load state.

The engine 15 is mounted on the front end of the vehicle body frame 19. The engine 15 of the present preferred embodiment is preferably a 4-stroke engine, but it can also be a 2-stroke engine. The 4-stroke engine has the advantages of having clean exhaust gas and a quiet engine sound. On the other hand, the 2-stroke engine has the advantages of being light weight, having high output, and a good low temperature start-up. A fuel tank 18 is provided above and to the rear of the engine 15. The handlebar 10 is arranged in front of the fuel tank 18, and a seat 17 is arranged behind the fuel tank 18.

The track belt 16 to which the driving force is transferred from the engine 15 is a propulsion unit particular to the snowmobile and has an endless track structure. In the track belt 16, a rear suspension 14 is provided. The rear suspension 14 holds the track belt 16.

Next, with reference to FIGS. 3A and 3B, the link mechanism and the conversion mechanism of the present preferred embodiment will be described, and with reference to FIG. 4, the stopper mechanism of the present preferred embodiment will be described.

Figure 3A:
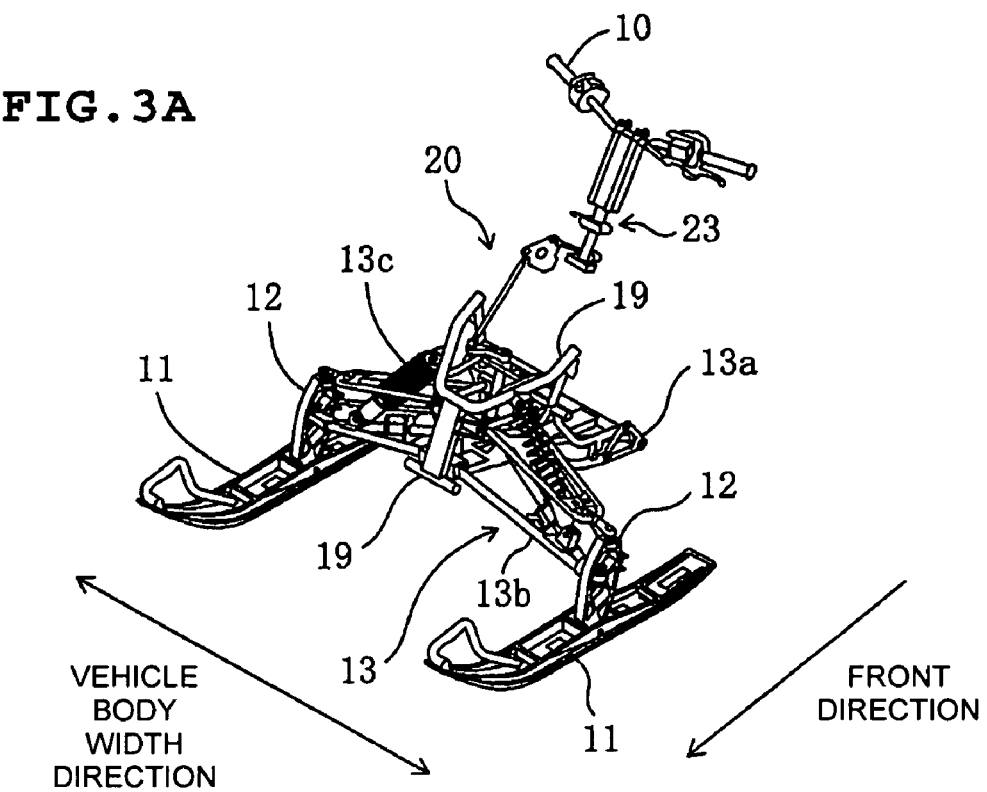
FIG. 3A is a perspective view showing the structure around a handlebar, a link mechanism, and a pair of skis 11.
Figure 3B:
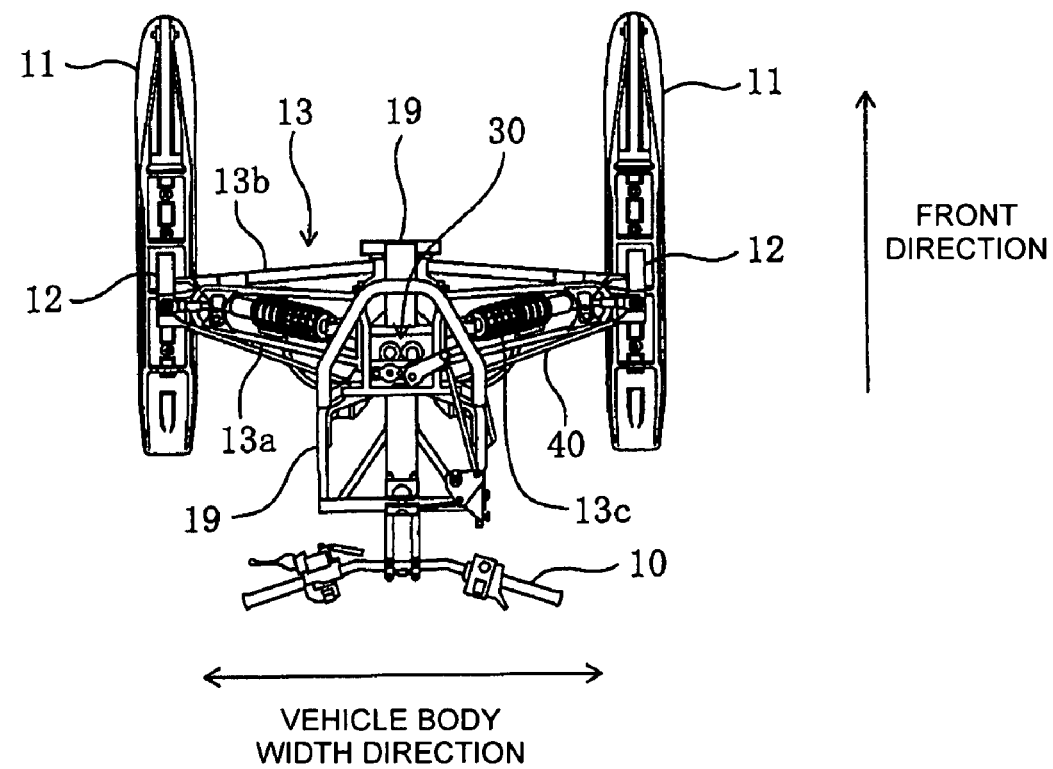
FIG. 3B is a top view thereof.
Figure 4:
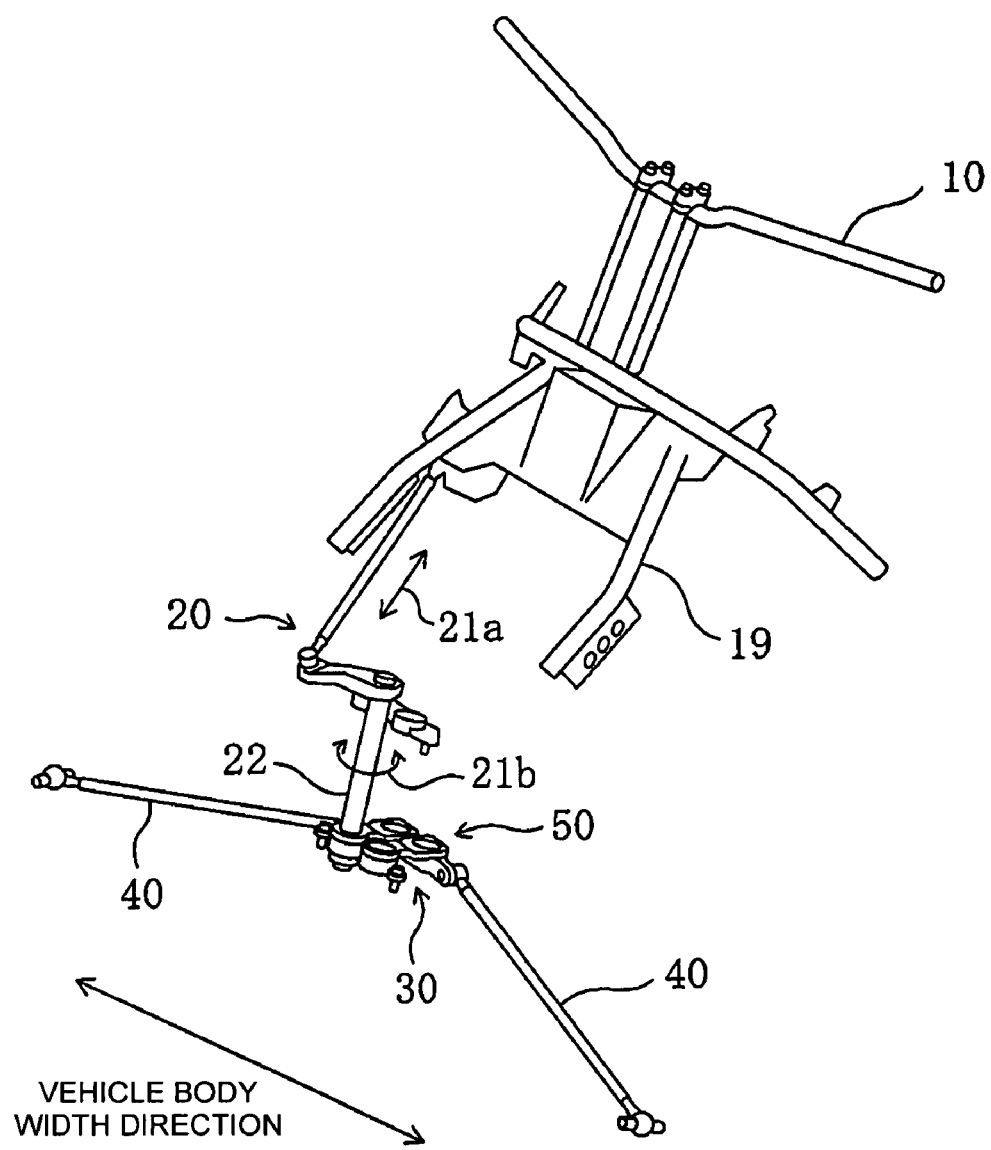
FIG. 4 is a perspective view showing the relationship of the handlebar, the link mechanism, a conversion mechanism, and a tie rod in more detail.

FIG. 3A is a perspective view showing the structure around the handlebar 10, a link mechanism 20, and the pair of skis 11, and FIG. 3B is a top view thereof. In FIG. 3B, a conversion mechanism 30 and a tie rod 40 are also illustrated. FIG. 4 is a perspective view showing the relationship of the handlebar 10, the link mechanism 20, the conversion mechanism 30, and the tie rod 40 in more detail.

The handlebar 10 which a rider operates is connected to the link mechanism 20, and the rotational movement of the handlebar 10 is transferred to the link mechanism 20. The link mechanism 20 is connected to the conversion mechanism 30, and movements 21a, 21b of the link mechanism 20 are converted into a movement including a vector in the vehicle body width direction by the conversion mechanism 30. The movement including a vector in the vehicle body width direction converted by the conversion mechanism 30 is for pushing and pulling the knuckle 12. In the illustrated example, the movement is generally a combined movement of a straight line movement and a rotational movement.

The tie rod 40 is coupled to the conversion mechanism 30, and the movement of the conversion mechanism 30 is transferred to the pair of skis 11 through the tie rod 40. In the structure of the present preferred embodiment, each ski 11 is coupled to each tie rod 40 through the knuckles 12. In addition, each ski 11 is connected to the vehicle body frame 19 through the suspension 13. Being a double wishbone type, the suspension (front suspension) 13 of the present preferred embodiment includes an upper arm 13*a*, a lower arm 13*b* and a shock absorber 13*c*.

Moreover, a handlebar side stopper 23 controlling the rotational movement of the handlebar 10 is provided between the link mechanism 20 and the handlebar 10. The handlebar side stopper 23 may be provided as a part of the link mechanism 20, or may also be provided upstream of the link mechanism 20 (e.g., downstream of the handlebar 10 or in a portion of the handlebar 10).

In the snowmobile 100 of the present preferred embodiment, a stopper mechanism 50 is provided between the tie rod 40 and the link mechanism 20, and the stopper mechanism 50 can regulate an external force applied from the pair of skis 11. Specifically, the kinetic energy input from the pair of skis 11 by a reactive force from the snow surface can be distributed and received by the stopper mechanism 50 provided between the tie rod 40 and the link mechanism 20, thereby alleviating excessive forces from extending to the link mechanism 20. As a result, the external force applied from the pair of skis 11 which is alleviated by the stopper mechanism 50 is transferred to the link mechanism 20 without increasing the complexity more than necessary or using an expensive material for the link mechanism 20 so as to increase the strength of the link mechanism 20. Therefore, the link mechanism 20 and/or the steering system can be simplified.

Since the stopper mechanism 50 of the present preferred embodiment is provided between the tie rod 40 and the link mechanism 20, it is possible to prevent the knuckle side stopper from not being in contact with the predetermined location by the stroke of the front suspension 13, unlike the case where the stopper is provided around the knuckle 12. In other words, by providing the stopper mechanism 50 upstream of the tie rod 40 instead of on the side of knuckle 12 downstream of the tie rod 40, the stopper mechanism 50 can readily operate before the handlebar side stopper 23 regardless of the stroke (range of motion) of the front suspension 13, and as a result, excessive input can be prevented from being applied to the steering system.

In other words, since the stopper mechanism 50 of the present preferred embodiment is not arranged on the knuckle 12, even when the rotation angle of the pair of skis 11 is changed by the stroke of the front suspension 13, the movement of the stopper mechanism 50 can be assured regardless of the change in the suspension. In addition, in the structure of the present preferred embodiment, since the knuckle side stoppers which are provided around each of the right and left knuckles 12 are replaced with a center stopper mechanism 50, the motion of the pair of skis 11 can be more accurately regulated.

Figure 5:
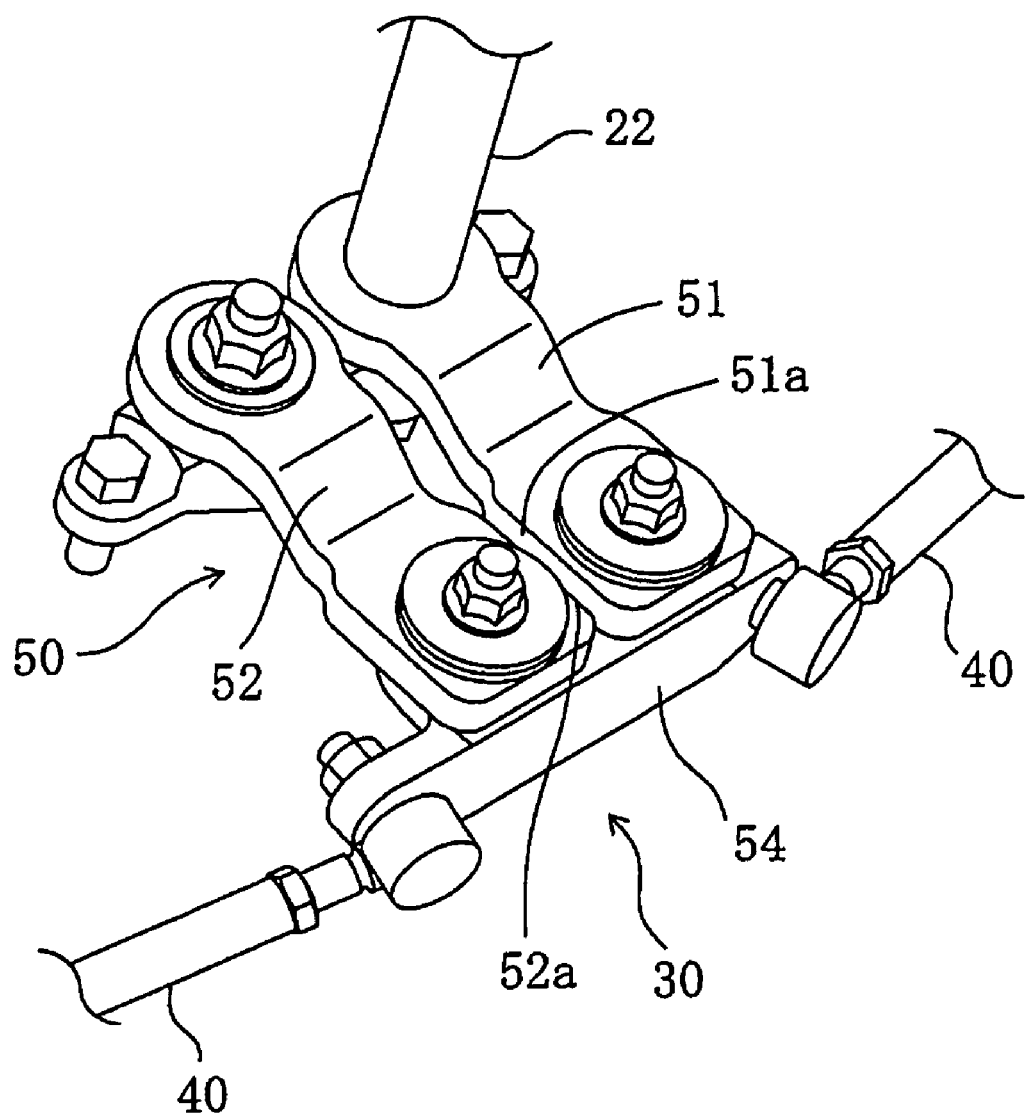
FIG. 5 is a perspective view showing the conversion mechanism and a stopper mechanism of the preferred embodiment of FIG. 1.

Next, with reference to FIG. 5, the conversion mechanism 30 and the stopper mechanism 50 of the present preferred embodiment will be further described. FIG. 5 is a perspective view showing the conversion mechanism 30 and the stopper mechanism 50.

In an example of the present preferred embodiment, a feature of the conversion mechanism 30 serves as the stopper mechanism 50. In other words, the present preferred embodiment utilizes a mechanism that performs both the functions of the conversion mechanism 30 and the stopper mechanism 50. Therefore, various advantages, e.g., a reduction in the number of components and cost achieved by utilizing common components, can be achieved.

The stopper mechanism 50 includes a main arm pivot 51 and a secondary arm pivot 52 restricting rotation of the main arm pivot 51. The main arm pivot 51 connects the rod 22, which transfers the movement (21*b* in FIG. 4) of the link mechanism 20, and the tie rod 40. The secondary arm pivot 52 is arranged in the rotation range of the main arm pivot 51 in the example shown in FIG. 5.

In particular, the main arm pivot 51 and the secondary arm pivot 52 are arranged adjacent to each other. The opposing surfaces 51*a*, 52*a* of the main arm pivot 51 and the secondary arm pivot 52 are in contact with each other, thereby restricting the rotation of the main arm pivot 51.

In the example shown in FIG. 5, a connection member 54 connects the main arm pivot 51 and the secondary arm pivot 52 to the tie rod 40. Since the main arm pivot 51 and the secondary arm pivot 52 are connected to the right and left tie rods 40 via the connection member 54, the rotation movement of the rod 22 in both the right and left directions can be converted into the movement including a vector in the vehicle body width direction.

Next, with reference to FIGS. 6A to 6C, the operations of the conversion mechanism 30 and the stopper mechanism 50 of the present preferred embodiment will be described. Note that the rod 22 is located on the right hand side in each of FIGS. 6A to 6C, but it can also be located on the left hand side.

Figure 6A:
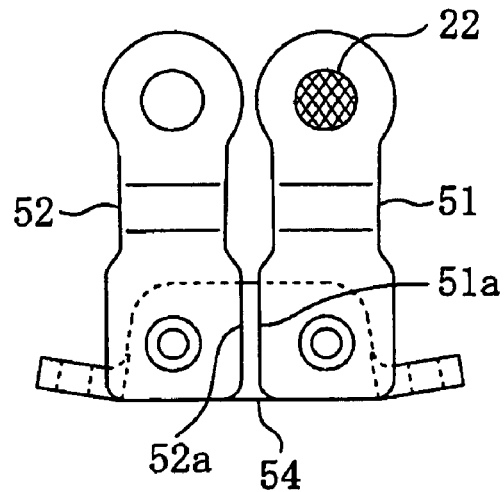
FIGS. 6A to 6C are top views showing an operation of the conversion mechanism and the stopper mechanism of the preferred embodiment of FIG. 1.

First, when the snowmobile is moving forward, as shown in FIG. 6A, the main arm pivot 51 and the secondary arm pivot 52 are parallel to the forward direction of the vehicle body, and the main arm pivot 51 and the secondary arm pivot 52 are not in contact with each other.

Figure 6B:
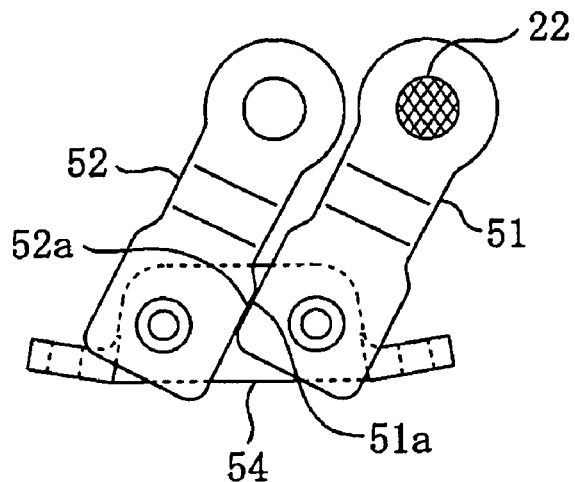

Next, when the handlebar is turned to the right, as shown in FIG. 6B, the main arm pivot 51 is in contact with the secondary arm pivot 52 so that the rotation of the main arm pivot 51 is restricted. Specifically, a portion of the inner surface 51*a* of the main arm pivot 51 is in contact with a portion of the inner surface 52*a* of the secondary arm pivot 52 so that the rotation of the main arm pivot 51 is restricted.

Note that in the structure of the present preferred embodiment, the opposite surfaces 51*a*, 52*a* of the arm pivots 51, 52 are in contact with each other at a position far apart from the rod 22. This is because contact at a distant point can decrease the influence of tolerance (error) as compared with contact at a close point.

Moreover, in order for the surfaces to come into contact at such a distant point, as shown in FIG. 6B, the structure is designed such that portions of the arm pivots 51, 52 that are closer to the rod 22 are not in contact with each other even when the handlebar is turned to the right.

Figure 6C:
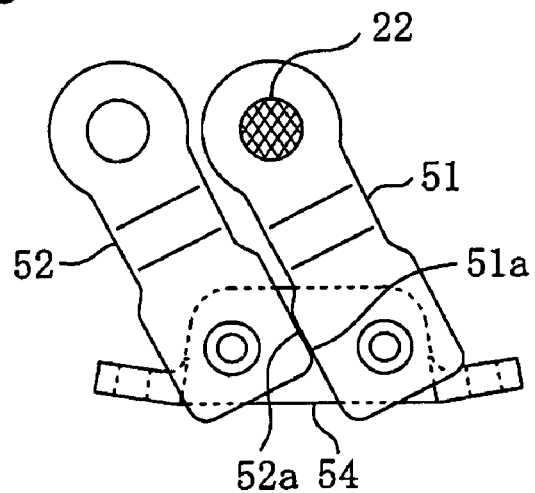

FIG. 6B shows the case where the handlebar is turned to the right, whereas FIG. 6C shows the case where the handlebar is turned to the left. It is conventional to perform a treatment (e.g., heat treatment) to increase the surface hardness such that the contact surfaces 51*a*, 52*a* of the arm pivots 51, 52 do not wear out and degrade their accuracy. A material with a high hardness may be used. But, the use of such a material may increase the material cost and processing cost of the material. Hence, it is conventional to perform a treatment (e.g., heat treatment) to increase the surface hardness for the contact surfaces 51*a*, 52*a* of the arm pivots 51, 52.

Next, with reference to FIGS. 7A to 9B, the relationship of the handlebar 10, the link mechanism 20, the conversion mechanism 30, the stopper mechanism 50, the tie rods 40, and the knuckles 12 will be described.

Figure 7A:
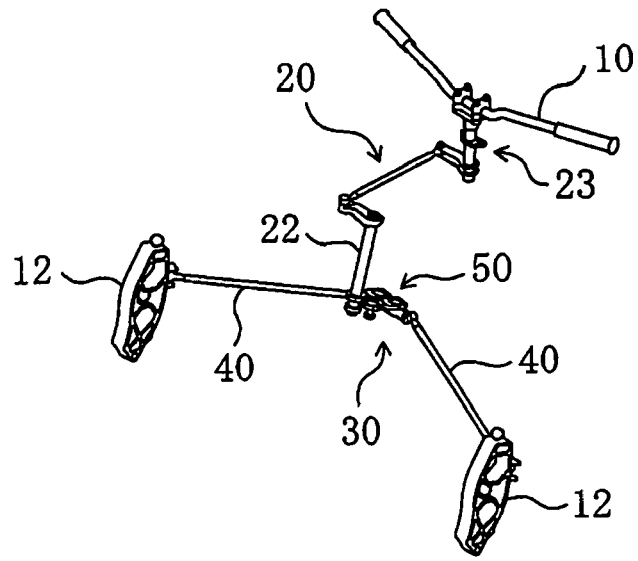
FIG. 7A is a perspective view showing the position of each mechanism during forward driving.
Figure 7B:
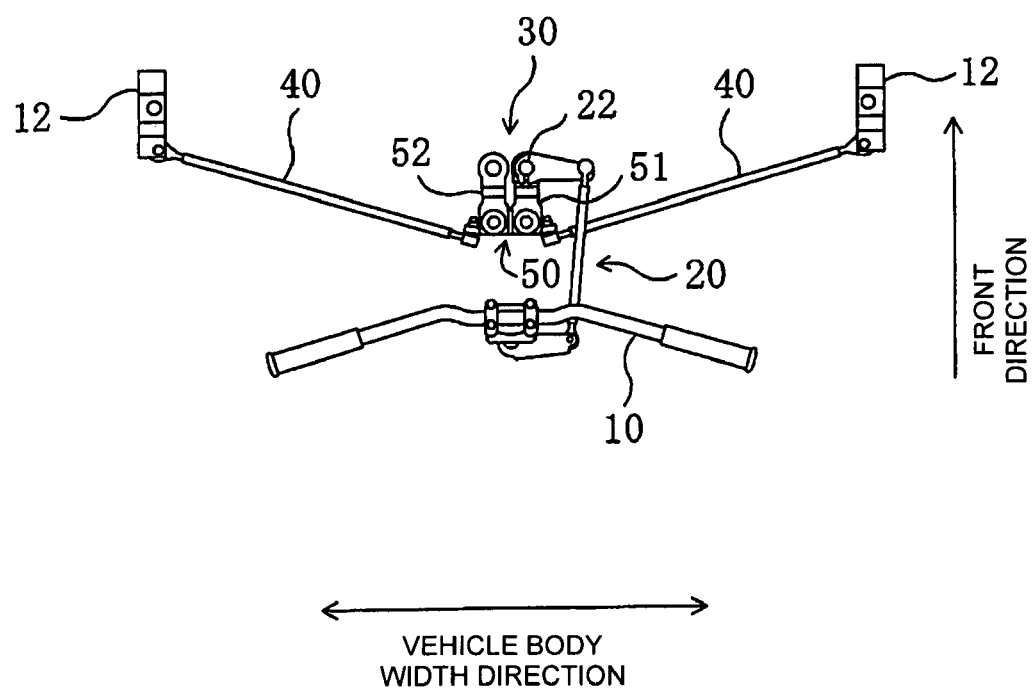
FIG. 7B is a top view thereof.

FIG. 7A is a perspective view showing the position of each mechanism during forward driving, and FIG. 7B is a top view thereof. As shown in FIGS. 7A and 7B, the handlebar 10 is not turned in any direction when the snowmobile is moving forward, and thus the main arm pivot 51 and the secondary arm pivot 52 are parallel to each other along the forward direction of the vehicle body. Accordingly, the right and left tie rods 40 and the knuckles 12 are symmetrically arranged.

Figure 8A:
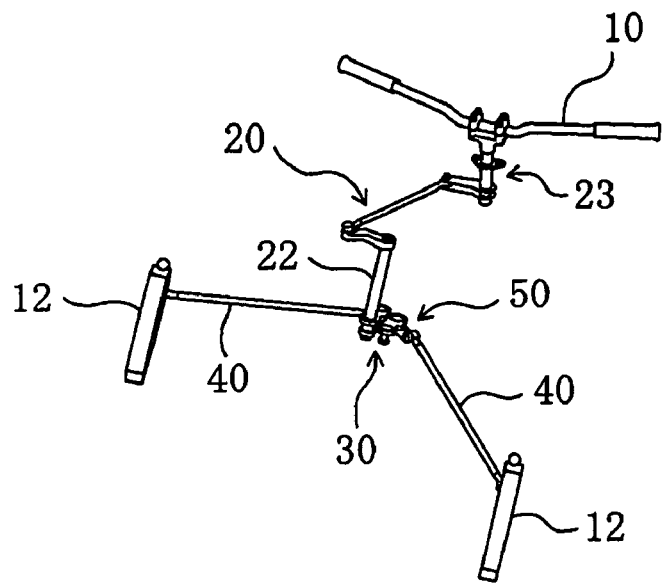
FIG. 8A is a perspective view showing the position of each mechanism when the handlebar turns to the left.
Figure 8B:
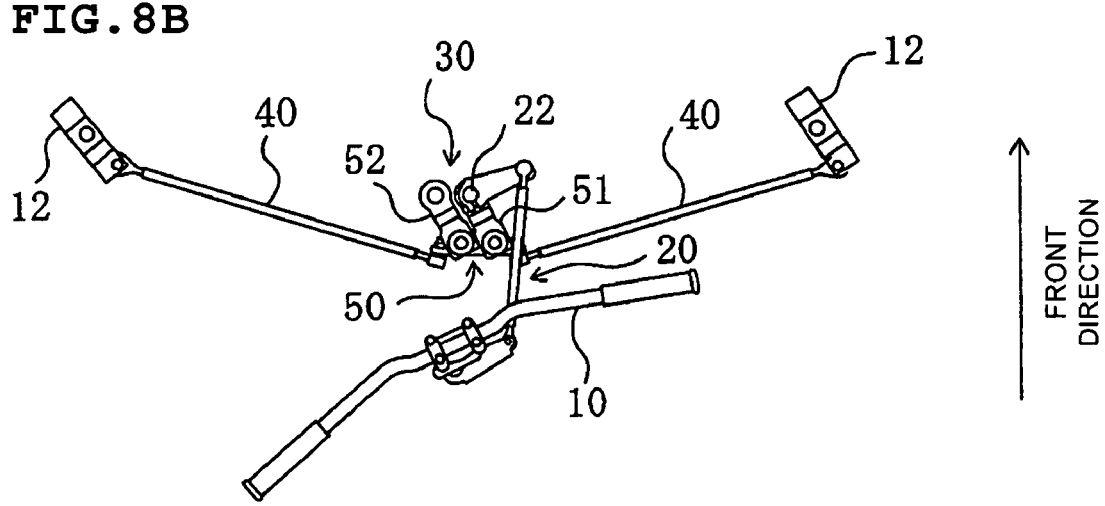
FIG. 8B is a top view thereof.

On the other hand, FIG. 8A is a perspective view showing the position of each mechanism when the handlebar 10 is turned to the left, and FIG. 8B is a top view thereof. As shown in FIGS. 8A and 8B, in this situation, the main arm pivot 51 and the secondary arm pivot 52 are in contact with each other to restrict the rotation thereof. Specifically, when the handlebar 10 is turned to the left over a predetermined angle, the stopper mechanism 50 disperses the external force applied from the pair of skis 11 and alleviates the transfer of the force to the link mechanism 20, regardless of the behavior of the front suspension. Since the handlebar 10 is turned to the left, the conversion mechanism 30 operates to pull in the left tie rod 40 and push out the right tie rod 40 thereby turning the left and right knuckles 12 to the left.

Figure 9A:
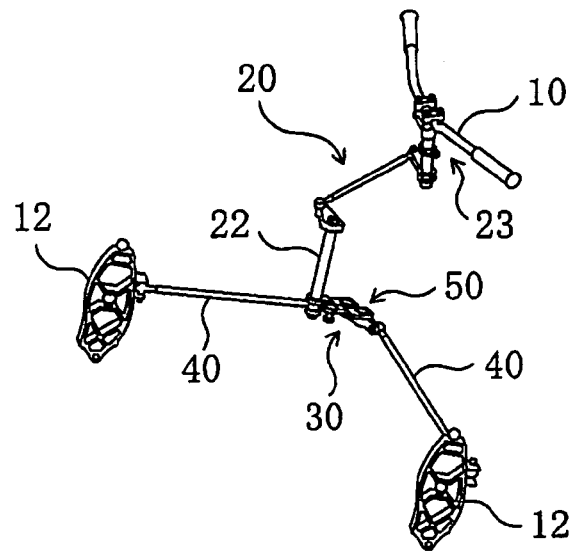
FIG. 9A is a perspective view showing a location relationship of each mechanism when the handlebar turns to the right.
Figure 9B:
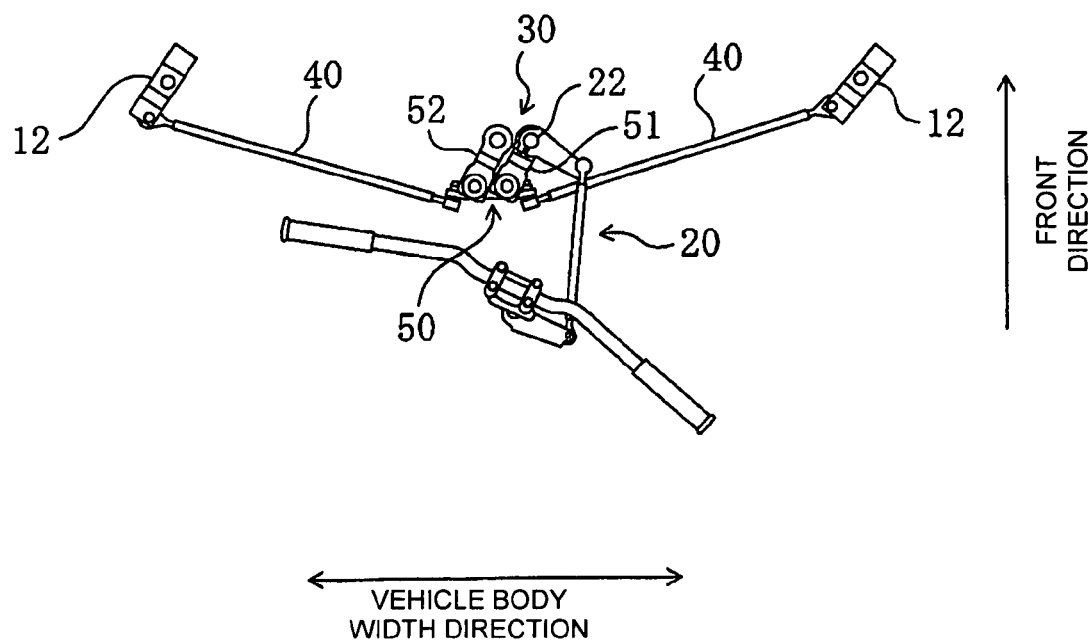
FIG. 9B is a top view thereof.

On the contrary, FIG. 9A is a perspective view showing the location relationship of each mechanism when the handlebar 10 is turned to the right, and FIG. 9B is a top view thereof. As shown in FIGS. 9A and 9B, in this situation, the main arm pivot 51 and the secondary arm pivot 52 are in contact with each other to restrict the rotation thereof. When the handlebar 10 is turned to the right over a predetermined angle, the stopper mechanism 50 is operated.

Since the handlebar 10 is turned to the right, the conversion mechanism 30 operates to pull in the right tie rod 40 and push out the left tie rod 40 thereby turning the left and right knuckles 12 to the right.

Preferred embodiments of the invention have been described above, but the invention should not be limited to the aforementioned description and various modifications are possible.

Figure 10A:
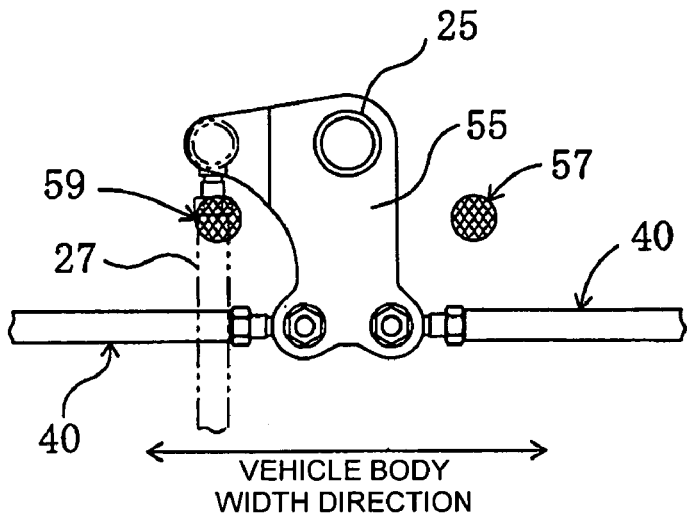
FIGS. 10A to 10C are top views showing variations of the conversion mechanism and the stopper mechanism according to the preferred embodiment of FIG. 1.
Figure 10B:
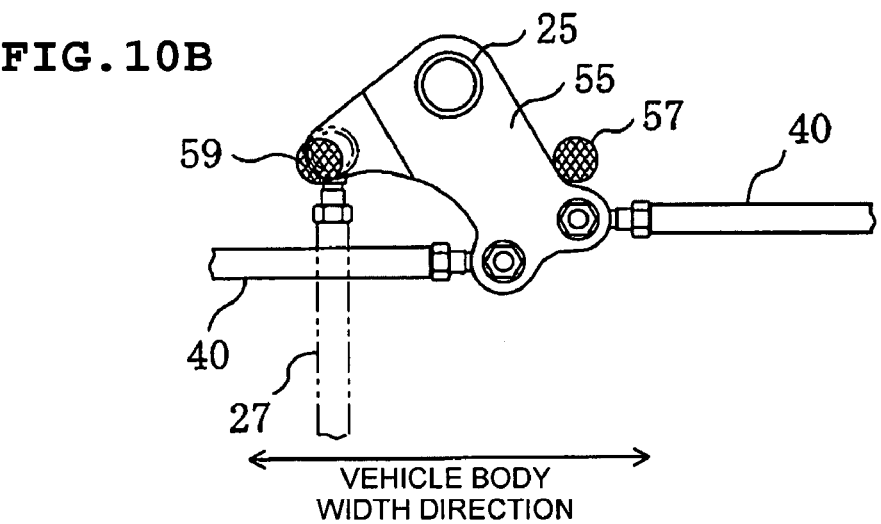
Figure 10C:
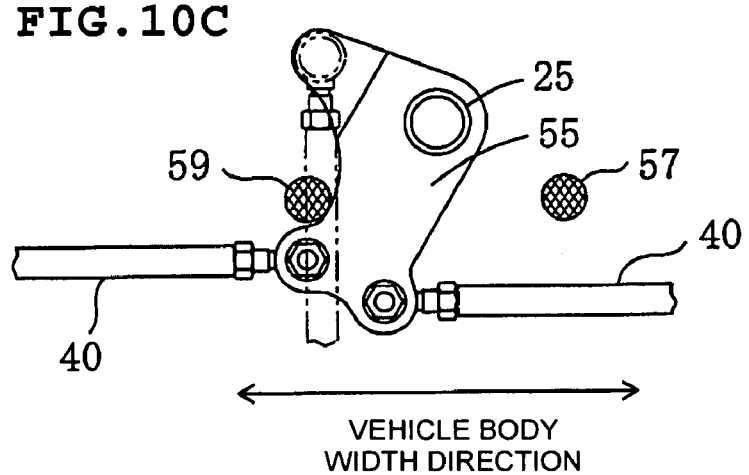

For example, the conversion mechanism 30 and the stopper mechanism 50 may be composed of separate units and the arm pivots may be integrated. FIGS. 10A to 10C show a modified example of the conversion mechanism 30 and the stopper mechanism 50 of the preferred embodiments of the invention described above. FIG. 10A illustrates the forward driving state and FIGS. 10B and 10C illustrate either of the states where the handlebar 10 is turned to the left or the right.

The stopper mechanism shown in FIGS. 10A to 10C operates by contacting the arm pivot 55 with the stoppers 57, 59. The arm pivot 55 connects members 25, 27 that transfer the rotational movement of the link mechanism 20 and the tie rods 40. Note that the arm pivot 55 also defines the conversion mechanism 30 in the modified example.

In the forward driving state shown in FIG. 10A, the arm pivot 55 does not incline to any direction, and the tie rods 40 are symmetrical. In the state shown in FIG. 10B, the stopper mechanism is operated by contacting the arm pivot 55 with the stopper 57. On the other hand, in the state shown in FIG. 10C, the stopper mechanism is operated by contacting the arm pivot 55 with the stopper 59.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snowmobile comprising:
   a pair of skis attached to a front portion of the snowmobile;
   a handlebar arranged to control the direction of the skis;
   a link mechanism arranged to transfer a rotational movement of the handlebar;
   a conversion mechanism connected to the link mechanism and arranged to convert a movement of the link mechanism into a movement including a vector in a vehicle body width direction of the snowmobile;
   tie rods coupled to the conversion mechanism and arranged to transfer the movement of the conversion mechanism to the skis; and
   a stopper mechanism provided between the tie rods and the link mechanism to regulate an external force applied from the skis; wherein
   the stopper mechanism includes a main arm pivot connecting the link mechanism to the tie rods, and a secondary arm pivot spaced from the main arm pivot by a predetermined distance such that inner surfaces of the main arm pivot and the secondary arm pivot contact each other so as to restrict a rotational movement of the main arm pivot.

2. The snowmobile of claim 1, wherein the main arm pivot and the secondary arm pivot are arranged adjacent to each other.

3. A snowmobile comprising:
   a pair of skis attached to a front portion of the snowmobile;
   a handlebar arranged to control the direction of the skis;
   a link mechanism arranged to transfer a rotational movement of the handlebar;
   a conversion mechanism connected to the link mechanism and arranged to convert a movement of the link mechanism into a movement including a vector in a vehicle body width direction of the snowmobile;
   tie rods coupled to the conversion mechanism and arranged to transfer the movement of the conversion mechanism to the skis; and
   a stopper mechanism provided between the tie rods and the link mechanism to regulate an external force applied from the skis; wherein
   the stopper mechanism includes an arm pivot connecting the link mechanism and the tie rods, and a first stopper spaced from the arm pivot so as to contact and restrict a rotation of the arm pivot in a first direction and a second stopper spaced from the arm pivot so as to contact and restrict the rotation of the arm pivot in a second direction.

4. The snowmobile of claim 1, wherein a handlebar stopper restricts a rotation movement of the handlebar, and the handlebar stopper is provided on the link mechanism or on the side of the handlebar.

5. The snowmobile of claim 1, wherein the skis are connected to a vehicle body frame of the snowmobile through a suspension.

6. The snowmobile of claim 1, wherein the skis are coupled to the tie rods through knuckles.

7. The snowmobile of claim 1, further comprising a double wishbone type suspension including an upper arm and a lower arm connected to each of the skis.

8. A stopper mechanism for a snowmobile comprising:
   a rod that is arranged to rotate with a rotation movement of a handlebar;
   a main arm pivot connected to the rod;
   a secondary arm pivot arranged adjacent to, and spaced a predetermined distance from, the main arm pivot to restrict rotation of the main arm pivot during turning of the snowmobile; and
   a connection member arranged to connect the main arm pivot and the secondary arm pivot to tie rods; wherein
   inner surfaces of the main arm pivot and the secondary arm pivot contact each other so as to restrict the rotational movement of the main arm pivot.

* * * * *